United States Patent [19]
Lagnemo et al.

[11] Patent Number: 5,929,015
[45] Date of Patent: *Jul. 27, 1999

[54] BLEACHING AGENT

[75] Inventors: Hans Lagnemo, Göteborg; Monica Jigstam, Torslanda, both of Sweden

[73] Assignee: EKA Chemicals AB, Bohus, Sweden

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/817,765

[22] PCT Filed: Aug. 24, 1995

[86] PCT No.: PCT/SE95/00958

§ 371 Date: Mar. 18, 1997

§ 102(e) Date: Mar. 18, 1997

[87] PCT Pub. No.: WO96/14389

PCT Pub. Date: May 17, 1996

[30] Foreign Application Priority Data

Nov. 3, 1994 [SE] Sweden .................................. 9403778

[51] Int. Cl.$^6$ .............................. D06L 3/02; C01B 15/10; C11D 3/39; C11D 3/18
[52] U.S. Cl. .............................. 510/378; 510/375; 8/111; 252/186.29; 252/186.32; 252/186.43
[58] Field of Search ........................ 252/186.25, 186.33, 252/186.43; 510/375, 378; 8/111

[56] References Cited

U.S. PATENT DOCUMENTS

| 3,975,280 | 8/1976 | Hachmann et al. . | |
|---|---|---|---|
| 4,075,116 | 2/1978 | Mesaros . | |
| 4,231,890 | 11/1980 | Yagi et al. | 252/186 |
| 5,340,496 | 8/1994 | Sato et al. | 252/186.27 |

FOREIGN PATENT DOCUMENTS

| 0459625 | 12/1991 | European Pat. Off. | 15/10 |
|---|---|---|---|
| 0567140 | 10/1993 | European Pat. Off. | 15/10 |
| 0573731 | 12/1993 | European Pat. Off. . | |
| 0623553 | 11/1994 | European Pat. Off. | 15/10 |
| 0634482 | 1/1995 | European Pat. Off. | 3/39 |
| 659082 | 12/1986 | Switzerland | 7/4 |
| 1466799 | 3/1977 | United Kingdom . | |
| 1538893 | 1/1979 | United Kingdom . | |
| 1575792 | 10/1980 | United Kingdom . | |
| WO 95/02555 | 1/1995 | WIPO | 15/10 |
| WO 95/18065 | 7/1995 | WIPO | 15/10 |
| WO 96/14388 | 5/1996 | WIPO | 15/10 |

*Primary Examiner*—Margaret Einsmann
*Attorney, Agent, or Firm*—McDermott, Will & Emery

[57] ABSTRACT

The invention relates to particles having a core comprising a peroxy compound with capability of releasing hydrogen peroxide or peroxy acids in aqueous solutions. The particles have a coating containing a silicate, and a water soluble magnesium salt, and the core and/or the coating contains an aliphatic organic compound or a salt thereof as a chelating agent. The invention also relates to preparation and use of the particles as well as a composition containing such particles.

23 Claims, No Drawings

BLEACHING AGENT

The present invention relates to particles having a core of a peroxy compound and a coating comprising a silicate, a water soluble magnesium salt, and an aliphatic organic compound as a chelating agent. The invention also relates to preparation and use of the particles. Further, the invention relates to a composition containing such coated particles.

Powder detergent compositions often contain peroxy compounds as bleaching agents which release hydrogen peroxide or peroxy acids in aqueous solutions. However, many peroxy compounds are not storage stable. Their decomposition is supposed to be catalysed by metal cations moving comparatively freely through the water normally being present in detergents, but is also facilitated by the alkaline pH (normally from about 8 to about 12) and by other components commonly present in detergents, for example zeolites or bleaching activators such as TAED (tetraacetylethylene diamine), TAGU (tetraacetylglucoluril) or PAG (penta acetyl glucose).

In order to make environmental friendly detergents, it is desirable to use alkali metal carbonate peroxy hydrate, commonly known as percarbonate, as a bleaching agent. However, the activity of percarbonate in a detergent decreases rapidly through decomposition if the detergent is stored at normal room temperature and humidity.

Many attempts to stabilize percarbonate have been done, for example by mixing or coating with stabilizing substances such as sulfates, carbonates, borates, silicates or organic substances. Such stabilizing methods are described in the patent literature, for example in GB 1446799, GB 1538893, GB 1575792, EP 459625, U.S. Pat. No. 3,975,280 and EP 573731.

U.S. Pat. No. 4,075,116 describes preparation of percarbonate from sodium carbonate, hydrogen peroxide and different additives.

CH patent 659082 describes mixing bleaching agents with water soluble acids.

The object of the present invention is to provide particles comprising a peroxy compound, particularly alkali metal percarbonate, with improved storage stability, particularly in detergent compositions. It is another object of the invention to provide particles comprising a peroxy compound only containing environmental friendly constituents.

Through the present invention, these objects have been fulfilled by providing particles having a core of a peroxy compound with capability of releasing hydrogen peroxide or peroxy acids in aqueous solutions, particularly in alkaline solutions. The particles have a coating containing a silicate and a water soluble magnesium salt. The core and/or the coating contains an aliphatic organic compound or a salt thereof as a chelating agent.

It has been found that the combination of silicate and a magnesium compound enables formation of magnesium silicate which is a very powerful stabilizer for peroxy compounds. Since magnesium silicate is not readily soluble in water, it has until now been difficult to apply it as a coating on particles of peroxy compounds. The presence of a chelating agent improves the stability of the peroxy compound significantly. The highest stability is achieved if both the core and the coating contains a chelating agent. However, the stability is very good even if the chelating agent is present in the coating only or in the core only.

The stability of the peroxy compound is further improved if the coating also contains at least one alkali metal salt of carbonate, bicarbonate or sulfate, alone or in mixtures. The alkali metal may for example include sodium, potassium or lithium, or mixtures thereof. Sodium is particularly preferred. The amount of said alkali metal salt is preferably from 0 to about 20% by weight, most preferably from 0 to about 10% by weight.

The different components of the coating can be in the same or in separate layers applied in one or several steps. Preferably, a first layer, counted from the core, contains the silicate and optionally one or more alkali metal salts of carbonate, bicarbonate or sulfate, while a second layer contains the magnesium salt and optionally one or more alkali metal salts of carbonate, bicarbonate or sulfate. A chelating agent is preferably included in at least one but most preferably in both the layers.

In addition to the peroxy compound, the core of the particles may contain alkali metal carbonate (e.g. soda ash), for example in an amount from 0 to about 50% by weight, preferably from 0 to about 30% by weight, and/or alkali metal silicate, for example in an amount from about 0.05 to about 7% by weight $SiO_2$ of the entire particle, preferably from about 0.2 to about 5% by weight $SiO_2$ of the entire particle, and/or a water soluble magnesium compound such as magnesium sulfate, for example in an amount from about 0.01 to about 5% by weight, preferably from about 0.1 to about 3% by weight expressed as magnesium sulfate. Preferably the core contains both silicate and a magnesium compound.

The silicate is suitably an alkali metal silicate, preferably of sodium, potassium or mixtures thereof, most preferably of sodium. The molar ratio $SiO_2:M_2O$, M being an alkali metal, is preferably from about 1 to about 3, most preferably from about 1 to about 2.5.

The amount of silicate in the coating is preferably from about 0.05 to about 7% by weight $SiO_2$ of the entire particle, most preferably from about 0.2 to about 5% by weight $SiO_2$ of the entire particle.

The particles suitably contain from about 0.05 to about 5% by weight of water soluble magnesium salt, preferably from about 0.1 to about 3% by weight of water soluble magnesium salt. The water soluble magnesium salt is preferably magnesium sulfate. The molar ratio $SiO_2:MgO$ in the coating can be from about 0.5 to about 8, preferably from about 1 up to about 5. Preferably from about 0 to about 90% by weight of the magnesium is in the coating.

Suitably, the chelating agent is an aliphatic organic compound or a salt thereof. Preferably, the compound comprises from 2 to 10 carbon atoms, most preferably from 4 to 8 carbon atoms. It is preferred to substantially exclude chelating agents containing phosphor such as phosphonic acid or salts thereof. It is also preferred to substantially exclude chelating agents which are not easily biodegradable such as EDTA (ethylene diamine tetraacetic acid) or DTPA (diethylene triamine pentaacetic acid, or chelating which for other reasons are questionable from an environmental point of view such as NTA (nitrilo triacetic acid).

The organic compound used as a chelating agent preferably comprises at least one hydroxyl group and/or at least one carboxylic acid group, most preferably two or more carboxylic acid groups or at least one carboxylic acid group and at least one hydroxyl group. In the case of one or more carboxylic acid groups being present, it is preferred to use alkali metal or alkaline earth metal salts of the acid. Alkali metals are preferably selected from sodium, potassium or mixtures thereof, and alkaline earth metals are preferably selected from calcium, magnesium or mixtures thereof. Sodium salts are particularly preferred.

One group of preferred chelating agents are salts of hydroxy carboxylic acids comprising one or several hydroxyl groups and one, two or three carboxylic acid groups. Another group of preferred chelating agents are salts of di-carboxylic acids. The most preferred chelating agents are salts of compounds satisfying the general formula:

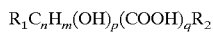

in which n=1–8, m=1–2n, p=0-n, q=0–2 and at least one of $R_1$ or $R_2$ is COOH and the other one is OH or COOH.

Examples of useful chelating agents are the following compounds or salts thereof: 2-pentenedioic acid, 2-(3-carboxy-1-oxopropoxy)-3-hydroxy-butanedioic acid, glucoheptonic acid, α-glucoheptonic acid, glutaric acid, carboxy methoxy succinic acid, glycerin monocitrate, 2,5-diethyl adipic acid, 3-tert-butyl-hexanedioic acid, oxydisuccinic acid, 2-butenedioxid acid, hydroxy-butanedioic acid, 2-ethylsuberic acid, tartaric acid, paratartaric acid, pyrotartaric acid, dihydroxy tartaric acid, heptonic acid, oxalosuccinic acid, carboxy succinic acid, 3-oxo-glutaric acid, galactaric acid, gluconic acid, dihydroxy-maleic acid, cork acid, aconitic acid, methylmaleic acid, 2-oxo-glutaric acid, oxalocitric acid, citric acid, isocitric acid, adipic acid, pimelic acid, glycolic acid, diglycolic acid, fumaric acid, 2-butenedioic acid, succinic acid, methylene-succinic acid, 1,2,3-tricarboxy propane, saccharic acid, ascorbic acid, 2-hydroxymethyl-crotonic acid, glyceric acid, hydroxy-pivalic acid, dimethylol-propionic acid, malonic acid, methyl-malonic acid, ethylene malonic acid, methylene malonic acid, (ethyleneoxy)di-malonic acid, hydracrylic acid, 2-methyl-hydracrylic acid, 3-hydroxy-propionic acid, hydroxy-pyruvic acid, (carboxymethyl) malonic acid, ethylmalonic acid, dimethyl malonic acid, 2-methyl malonic acid, hydroxy-malonic acid, ethylene lactic acid, mesoxalic acid and glycerolic acid.

Also chelating agents selected among amino acids or salts thereof may be used, for example 2-amino-1,1,2-ethanetricarboxylic acid, aspartic acid, 2-(hydroxymethyl)-aspartic acid, aminomethyl propanedioic acid, β-alanine diacetic acid, serine, serine-diacetic acid, isoserin diacetic acid, glycine-serine, 2-methyl-serine, N-methyl-serine, 2-aminomalonic acid, N-hydroxyimino diacetic acid, N-(carboxymethyl)maleamic acid, N-(carboxymethyl) glutamic acid, N-(carboxymethyl)aspartic acid, N-(2-hydroxyethyl)sarcosine, iminodisuccinic acid, 3-bis (carboxymethyl)amino)propionic acid, N-(hydroxyethyl) glycine, methylglycine-diacetic acid, N-ethyliminodiacetic acid, methyliminodiacetic acid, nitrilotris(propionic acid), 3,3'-iminodipropionic acid, diethanol glycine, diglycine, triglycine, ethanolamine-N,N-diacetic acid, glutamic acid and aspartic acid.

One particularly preferred group of chelating agents is alkali metal salts or alkaline earth metal salts of a hydroxy carboxylic acid satisfying the formula:

in which R is $CH_2OH$ or COOH, n is 2–6, and m is 0-n. Preferred chelating agents of this group are alkali metal salts of hydroxy carboxylic acids according to the above formula. Preferably R is $CH_2OH$. It is also preferred that n is 4 or 5. Preferably, m is equal to n or n-2, the carbon chain thus being saturated or containing one double bond. A particularly preferred chelating agent is alkali metal glucoheptonate which is the alkali metal salt of the compound according to the above formula when R is $CH_2OH$ and n is 5. Other preferred chelating agents are alkali metal gluconate (R is $CH_2OH$, n and m are 4) and alkali metal ascorbate (R is $CH_2OH$, n is 4 and m is 2). Other useful chelating agents include, for example, salts of trihydroxy glutaric acid, tartaric acid or saccharic acid.

Another particularly preferred group of chelating agents is dicarboxylic acids comprising from 2 to 10 carbon atoms, preferably from 4 to 8 carbon atoms, most preferably from 5 to 7 carbon atoms. Preferably, the carboxylic acid groups are located at the ends of the carbon chain. Further, the dicarboxylic acid preferably does not comprise any hydroxyl groups and most preferably it does not comprise any functional groups except the carboxylic acid groups. The most preferred dicarboxylic acids satisfy the formula:

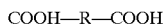

in which R is alkylene, which is preferred, or alkenylene, having from 2 to 8 carbon atoms, preferably from 3 to 5 carbon atoms. Preferably, R is a straight chain without branches. Examples of useful dicarboxylic acids are succinic acid, glutaric acid adipic acid, pimelic acid, suberic acid, azelaic acid, sebacic acid and mixtures thereof.

Particularly preferred chelating agents are selected from the group consisting of salts of citric acid, gluconic acid, glucoheptonic acid, saccharic acid, glutaric acid and pimelic acid.

The particles may include two or more different chelating agents as described herein. The coating and the core may contain the same or different chelating agents according to the description above.

The particles preferably comprise from about 0.1 to about 20% by weight, most preferably from about 0.5 to about 15% by weight of a chelating agent. It is particularly preferred that the chelating agent in the coating constitutes from about 0.1 to about 15% by weight, most preferably from about 0.5 to about 10% by weight of the particle, and that the chelating agent in the core constitutes from about 0.1 to about 10% by weight, most preferably from about 0.2 to about 5% by weight of the particle. Preferably from about 50 to about 100% by weight of the total amount of the chelating agent is in the coating of the particle.

Suitably, the particles have an average diameter from about 50 to about 3000 μm, preferably from about 100 to about 1250 μm. The preferred density is from about 600 to about 1500 g/l, particularly from about 800 to about 1100 g/l. It has been found that a high density as well as a high average particle size improves the storage stability.

The invention is particularly advantageous if the peroxy compound is alkali metal percarbonate, but also other peroxy compounds can be stabilized, for example alkali metal salts of perborates, peroxysulfates, peroxyphosphates or peroxysilicates, peroxycarboxylic acids or peroxycarboxylic acid releasing compounds such as di-acylated di-peroxy carboxylic acids (see WO 91/17143). The particles preferably contains from about 10 to about 99% by weight, most preferably from about 50 to about 95% by weight of a peroxy compound.

The invention also concerns a method of preparing particles as described above. The method comprises the step of applying a coating to particles comprising a peroxy compound with capability of releasing hydrogen peroxide or peroxy acids in aqueous solutions, the coating containing a silicate, and a water soluble magnesium salt. If said particles do not contain an aliphatic organic compound or a salt thereof as a chelating agent, the coating contains an aliphatic organic compound or a salt thereof as a chelating agent. If said particles do contain an aliphatic organic compound or a salt thereof as a chelating agent, the coating optionally contains an aliphatic organic compound or a salt thereof as a chelating agent. Optionally, the coating also contains an alkali metal salt of carbonate, bicarbonate or sulfate. Preferably, the method comprises the steps of applying a solution containing a silicate and applying a solution of a magnesium salt, and drying the coated particles, wherein preferably at least one and most preferably both the solutions also contain a chelating agent. Most preferably, the method comprises the steps of forming a first layer by applying a solution containing a silicate, drying said first layer, forming a second layer by applying a solution of a magnesium salt, and drying the coated particles, wherein preferably at least one and most preferably both the solutions also contain a chelating agent. It is also possible to apply the solutions simultaneously in one layer, for example by spraying with different nozzles. The solution or solutions containing the chelating agent preferably has a pH from about 7 to about 13, most preferably from about 8 to about 11. One or both of the solutions may also contain one or several alkali metal salts of carbonate, bicarbonate or sulfate. The solutions are suitably aqueous and are preferably applied by spraying, for example in a drum or a fluid bed.

The particles to be coated comprising the peroxy compound, may contain alkali metal silicate, a magnesium compound, a chelating agent, alkali metal carbonate or other suitable ingredients. Such particles may for example be prepared from fine particles mainly consisting of a peroxy compound, preferably with a particle diameter less than about 200 $\mu$m, adding a chelating agent and/or alkali metal silicate and/or other optional ingredients, and granulating the mixture to obtain particles of a suitable size, which particles then can be coated. Granulation may be performed by conventional methods well known among those skilled in the art, such as compacting, extruding, agglomeration in drum or disk, fluid-bed granulation, prilling or in different kinds of mixers. A chelating agent, alkali metal silicate and other optional ingredients can also be included directly when, for example, alkali metal percarbonate is produced from alkali metal carbonate and hydrogen peroxide. Alkali metal silicate is preferably added in the form of an aqueous solution, and the chelating agent is preferably mixed therein before addition to the peroxy compound.

Regarding preferred peroxy compounds, chelating agents, silicates, magnesium salts, alkali metal salts and other components, as well as suitable amounts thereof, the above description of the particles according to the invention is referred to.

The invention further concerns use of the described particles comprising a peroxy compound and a chelating agent as a bleaching agent, preferably in connection with washing of textiles or dishwashing. The washing water may be supplied with particles according to the invention being included in a detergent composition or being in the form of a separate bleaching powder. Preferably, washing water is supplied with particles in an amount so to obtain from about 0.001 to about 1 gram active oxygen per liter, which for example corresponds to from about 0.01 to about 6 grams sodium percarbonate.

Finally, the invention concerns a composition containing an inert filler, and/or one or several substances active at washing, which composition further contains particles comprising a peroxy compound, a chelating agent according to the invention, for example in an amount from about 1 up to about almost 100% by weight. The composition may comprise a mixture of particles containing different kinds of peroxy compounds. The substances active at washing may include detergent builders, surfactants, alkali generating substances, bleaching activators, or any other substances commonly used in detergents. The detergent builder may for example be selected from phosphates, zeolites, polycarboxylates, citrates, crystalline disilicates, amorphous disilicates (e.g. Britesil™), or mixtures thereof. The surfactants are preferably selected from anionic surfactants, nonionic surfactants, soaps or mixtures thereof. Anionic surfactants may for example be selected from linear alkylbenzene sulfonates, secondary alkane sulfonates, alcoholethoxysulfates or alpha-olefine sulfonates. Nonionic surfactants may for example be selected from alkoxylated compounds such as fatty alcohols, alkylphenols and alkylamines. Soaps may for example be selected from sodium or potassium salts of tallow. Also cationic surfactants such as quaternary ammonium compounds or imide azolinium salts, as well as amphoteric surfactants might be used. Alkali generating substances may for example be selected from carbonates, silicates, phosphates or mixtures thereof. The bleaching activators may for example be selected from TAED, TAGU, SNOBS (sodium nonoyl benzene sulfonate), PAG (penta acetyl glucose) or diacylated diperoxy carboxylic acids (see WO 91/17143). The filler may include any inert substance such as sodium sulfate. The composition may constitute a complete detergent or a bleaching powder to be added separately at washing.

A complete detergent for washing of textiles suitably contains from about 1 to about 30% by weight, preferably from about 10 to about 20% by weight of particles according to the invention. Further, the detergent suitably contains a detergent builder, for example from about 5 to about 50% by weight, surfactants, for example from about 5 to about 35% by weight and an alkali generating substance, for example from about 5 to about 20% by weight. Preferably, the detergent contains from about 5 to about 20% by weight of anionic surfactants, from about 2 to about 15% by weight of nonionic surfactants, and from about 0.1 to about 5% by weight of soaps. The detergent may also contain bleaching activators, for example from about 1 to about 10% by weight, and fillers such as sodium sulfate, for example from about 5 to about 50% by weight. Although not preferred from an environmental point of view, it is possible to include chelating agents such as phosphonates or EDTA, for example in an amount from about 0.1 to about 1% by weight. Additionally, the detergent may contain conventional components such as water glass, carboxy methyl cellulose, enzymes, foam regulators, perfumes, colouring agents, optical brighteners and water. The detergent can be prepared with conventional methods such as dry mixing, agglomeration or spray drying. If the preparation involves spray drying, any heat sensible component such as particles comprising peroxy compounds, enzymes and perfumes should be added to the dried material.

A separate bleaching powder may comprise up to almost 100% by weight of particles containing peroxy compounds according to the invention, but preferably the content is from about 5 to about 90% by weight. The bleaching powder may comprise only one peroxy compound or a mixture of particles containing different kinds of peroxy compounds. It is advantageous if a hydrogen peroxide generating substance such as percarbonate, for example from about 10 to about 75% by weight, is used in combination with a bleaching activator such as TAED or TAGU, for example from about 2 to about 25% by weight. Also other bleaching activators such as a diacylated dipercarboxylic acid may be used, for example in an amount from about 2 to about 25% by weight. A bleaching powder may also contain detergent builders, for example from about 5 to about 90% by weight, surfactants, for example up to about 10% by weight, enzymes, for example up to about 2% by weight, or fillers, for example from about 5 to about 90% by weight. A preferred bleaching powder consists essentially of from about 30 to about 75% by weight of particles containing percarbonate, from about 10 to about 25% by weight of a bleaching activator, the balance preferably substantially being detergent builders, fillers, surfactants, water or mixtures thereof.

A detergent for dishwashing may be in the form of a low alkaline detergent (pH of washing water intended to be about 10–11) suitably containing from about 2 to about 15% by weight of a bleaching agent comprising coated particles according to the invention, such as coated sodium percarbonate, from about 5 to about 50% by weight of alkali metal disilicate, from 0 to about 40% by weight of alkali metal carbonate, from about 15 to about 50% by weight of builders such as sodium citrate and polycarboxylates or sodium tri polyphosphate (STPP) from about 0.5 to about 5% by weight of low foaming nonionic surfactants, from about 0.5 to about 5% by weight of enzymes and from about 1 to about 6% by weight of bleaching activators such as TAED. A dishwasher detergent may also be high alkaline (pH of washing water intended to be about 11–12) having a similar composition as the low alkaline detergent, the disilicate however being replaced with from about 20 to about 80% by weight of alkali metal metasilicate and the builder preferably substantially consisting of STPP.

The present invention makes it possible to prepare stable bleaching agents comprising peroxy compounds, particularly percarbonate, which may be used in detergents including zeolites such as zeolite 4A. The invention also makes it possible to decrease or exclude the use of other chelating agents in detergents, such as the commonly used EDTA or phosphonates which are less suitable from an environmental point of view.

The invention will now be described through the following example which, however, not is intended to limit the scope of the invention. If not otherwise stated, all contents an percentages refer to content and percent by weight.

EXAMPLE 1

Sodium percarbonate particles with a diameter of about 200–1250 μm and a density of about 1000 g/l were coated in two steps by spraying with a first aqueous solution in a rotating drum, drying in the drum, spraying with a second aqueous solution in the drum, and drying in a fluidized bed. The first aqueous solution contained 40% by weight sodium disilicate and optionally sodium glucoheptonate. The second aqueous solution contained 10% by weight magnesium sulfate, optionally sodium glucoheptonate, and optionally sodium sulfate. The temperature was 50–60° C. in the rotating drum and 70° C. in the fluidized bed. In order to test the storage stability of the percarbonate, the prepared particles as well as uncoated particles were included in a standard detergent IEC-Z (Henkel) consisting of 9.7% linear alkyl benzenesulfonate ($C_{average}$11.5), 5.2% ethoxylated $C_{12-18}$alcohol ($EO_7$), 3.6% sodium-soap, 32.5% zeolite A, 13.0% sodium carbonate, 5.2% sodium salt of copolymerisate of acrylic- and maleic acid ($CP_5$), 3.9% sodium waterglass (ratio 3.3), 1.3% carboxy methyl cellulose, 0.3% EDTA, 0.3% optical brightener (stilbene type), 24.4% sodium sulfate, water and foam regulator, 0.6% enzyme prills protease (activity 300.00). Samples were prepared from 64 grams IEC-Z, 12 grams percarbonate particles and 4 grams TAED. A Quick Stability Index (QSI) was determined for each sample by measuring the amount of oxygen formed during 24 hours storage at 40° C. and dividing the amount of oxygen liberated by the relative content (%) of active oxygen in the original percarbonate. Thus, a low QSI-value means high stability. The QSI-values for the particles with different coating compositions are shown in the table below, in which the contents of the different constituents refer to % by weight based on the entire particle. A.O. refers to active oxygen in the particles.

| $SiO_2$ | Na-gluc. layer 1 | Na-gluc. layer 2 | $MgSO_4$ | $Na_2SO_4$ | A.O. | QSI |
|---|---|---|---|---|---|---|
| 0 | 0 | 0 | 0 | 0 | 14.8 | 2.8 |
| 1 | 0 | 0 | 1 | 0 | 14.2 | 1.7 |
| 1 | 1.5 | 0 | 1 | 0 | 13.1 | 0.7 |
| 1 | 0 | 1.5 | 1 | 0 | 14.0 | 1.0 |
| 1 | 0.5 | 0 | 1 | 0 | 14.0 | 1.9 |
| 1 | 0 | 0.5 | 1 | 0 | 14.1 | 1.9 |
| 1 | 0 | 0 | 1 | 5 | 13.8 | 1.8 |
| 1 | 1.5 | 0 | 1 | 5 | 13.6 | 0.65 |
| 1 | 0 | 1.5 | 1 | 5 | 13.3 | 0.4 |
| 1 | 0.5 | 0 | 1 | 5 | 13.5 | 1.0 |
| 1 | 0 | 0.5 | 1 | 5 | 13.5 | 1.2 |
| 1 | 0 | 0 | 1 | 10 | 13.0 | 0.7 |
| 1 | 1.5 | 0 | 1 | 10 | 13.4 | 0.5 |
| 1 | 0 | 1.5 | 1 | 10 | 13.6 | 0.7 |

-continued

| SiO$_2$ | Na-gluc. layer 1 | Na-gluc. layer 2 | MgSO$_4$ | Na$_2$SO$_4$ | A.O. | QSI |
|---|---|---|---|---|---|---|
| 1 | 0.5 | 0 | 1 | 10 | 12.9 | 0.7 |
| 1 | 0 | 0.5 | 1 | 10 | 12.9 | 0.5 |

EXAMPLE 2

Particles were prepared and tested as in Example 1 with the exception that EDTA was used instead of sodium glucoheptonate. The results appear in the table below:

| SiO$_2$ | EDTA layer 1 | EDTA layer 2 | MgSO$_4$ | Na$_2$SO$_4$ | A.O. | QSI |
|---|---|---|---|---|---|---|
| 1 | 1.5 | 0 | 1 | 0 | 13.6 | 2.3 |
| 1 | 1.5 | 0 | 1 | 5 | 13.2 | 1.7 |
| 1 | 1.5 | 0 | 1 | 10 | 12.8 | 1.2 |

EXAMPLE 3

Sodium percarbonate particles were coated as in Example 1 with a first solution of sodium silicate (SiO$_2$:Na$_2$O ratio 1), sodium glucoheptonate and/or sodium salt of glutaric acid, and a second solution of magnesium sulfate and optionally sodium sulfate or sodium bicarbonate. In one experiment a third solution of sodium carbonate was applied. The stability of the percarbonate was tested as in Example 1 and the results appear in the table below:

| SiO$_2$ | Na-gluc. | Na-glut. | MgSO$_4$ | Na$_2$SO$_4$ | Na$_2$CO$_3$ | NaHCO$_3$ | A.O. | QSI |
|---|---|---|---|---|---|---|---|---|
| 0.9 | 1.5 | 0 | 1.4 | 10 | 0 | 0 | 13.0 | 0.27 |
| 0.9 | 0 | 1.5 | 1.4 | 10 | 0 | 0 | 12.8 | 0.28 |
| 0.9 | 0.75 | 0.75 | 1.4 | 10 | 0 | 0 | 12.9 | 0.22 |
| 0.9 | 0.75 | 0.75 | 1.4 | 0 | 10 | 0 | 12.4 | 0.16 |
| 0.9 | 0.75 | 0.75 | 1.4 | 0 | 0 | 10 | 12.8 | 0.00 |

We claim:

1. Particles having a core comprising a peroxy compound with capability of releasing hydrogen peroxide or peroxy acids in aqueous solutions, wherein the particles have a coating containing magnesium silicate and the core and/or the coating contains an aliphatic organic compound or a salt thereof as a chelating agent, wherein said magnesium silicate in the coating has been formed from a silicate and a water soluble magnesium salt applied as separate solutions in the same or separate layers.

2. Particles as claimed in claim 1, wherein the chelating agent does not comprise EDTA, DTPA or NTA.

3. Particles as claimed in claim 1, wherein the chelating agent does not comprise phosphonic acids or salts thereof.

4. Particles as claimed in claim 1, wherein the aliphatic organic compound comprises from 2 to 10 carbon atoms.

5. Particles as claimed in claim 1, wherein the chelating agent is a salt of a compound satisfying the formula:

$$R_1C_nH_m(OH)_p(COOH)_qR_2$$

in which n=1–8, m=1–2n, p=0-n, q=0–2 and at least one of $R_1$ and $R_2$ is COOH and the other one is OH or COOH.

6. Particles as claimed in claim 1, wherein the chelating agent is an alkali metal salt or alkaline earth metal salt of a hydroxy carboxylic acid satisfying the formula:

$$RC_nH_m(OH)_nCOOH$$

in which R is CH$_2$OH or COOH, n is 2–6, and m is 0-n.

7. Particles as claimed in claim 1, wherein the chelating agent is a dicarboxylic acid comprising from 2 to 10 carbon atoms.

8. Particles as claimed in claim 1, wherein the chelating agent is selected from the group consisting of salts of citric acid, gluconic acid, glucoheptonic acid, saccharic acid, glutaric acid and pimelic acid.

9. Particles as claimed in claim 1, wherein the chelating agent is a salt of glucoheptonic acid.

10. Particles as claimed in claim 1, wherein the chelating agent is salt of glutaric acid.

11. Particles as claimed in claim 1, wherein the silicate and the magnesium salt have been applied in the form of solutions.

12. Particles as claimed in claim 1, wherein the water soluble magnesium salt is magnesium sulfate.

13. Particles as claimed in claim 1, wherein the coating also contains at least one alkali metal salt of carbonate, bicarbonate or sulfate.

14. Particles as claimed in claim 1, wherein the coating comprises a first layer, counted from the core, containing the silicate, while a second layer contains the magnesium salt, the chelating agent being included in the core or in at least one of said layers.

15. Particles as claimed in claim 1, wherein the coating contains a chelating agent.

16. Particles as claimed in claim 1, wherein the core contains a chelating agent.

17. Particles as claimed in claim 1, wherein the peroxy compound is alkali metal percarbonate.

18. A composition comprising particles as claimed in claim 1, and at least one of an inert filler and a substance active at washing.

19. A method of preparing particles comprising applying a coating to particles comprising a peroxy compound with capability of releasing hydrogen peroxide or peroxy acids in aqueous solutions, the coating containing magnesium silicate formed by applying a silicate and a water soluble magnesium salt as separate solutions in the same or separate layers, if said particles do not contain an aliphatic organic compound or a salt thereof as a chelating agent, the coating containing an aliphatic organic compound or a salt thereof as a chelating agent, if said particles do contain an aliphatic organic compound or a salt thereof as a chelating agent, the coating optionally containing an aliphatic organic compound or a salt thereof as a chelating agent.

20. A method as claimed in claim 19, wherein the method includes the steps of applying a solution containing a silicate and applying a solution of a magnesium salt, and drying the coated particles, wherein optionally one or both the solutions also contain a chelating agent.

21. A method for bleaching an article, comprising contacting the article with a bleaching agent comprising particles having a peroxy compound with capability of releasing hydrogen peroxide or peroxy acids in aqueous solutions, wherein the particles have a coating containing a silicate and a water soluble magnesium salt, and the core and/or the coating contains an aliphatic organic compound or a salt thereof as a chelating agent.

22. A detergent composition comprising a peroxy compound with capability of releasing hydrogen peroxide or peroxy acids in aqueous solutions, wherein the particles have a coating containing a silicate and a water soluble magnesium salt, and the core and/or the coating contains an aliphatic organic compound or a salt thereof as a chelating agent.

23. Particles having a core comprising alkali metal percarbonate and a coating comprising a silicate and magnesium sulfate and wherein at least one of the core or coating includes glucoheptonic acid as a chelating agent.

* * * * *